US006163872A

United States Patent [19]

Wolf

[11] Patent Number: 6,163,872
[45] Date of Patent: Dec. 19, 2000

[54] MONITORING OAM CELL ASSISTED METHOD OF DETECTING BIT ERRORS OCCURRING IN ATM USEFUL CELLS ON AN ATM TRANSMISSION LINK

[75] Inventor: Andreas Wolf, Seehof, Germany

[73] Assignee: Textronix, Inc., Beaverton, Oreg.

[21] Appl. No.: 09/077,427

[22] PCT Filed: Sep. 26, 1997

[86] PCT No.: PCT/DE97/02275

§ 371 Date: Jul. 26, 1999

§ 102(e) Date: Jul. 26, 1999

[87] PCT Pub. No.: WO98/14030

PCT Pub. Date: Apr. 2, 1998

[51] Int. Cl.[7] .................. H03M 13/00

[52] U.S. Cl. .................. 714/776; 714/752; 714/704; 714/777; 714/782; 714/712

[58] Field of Search .................. 714/752, 776, 714/704, 712, 777, 782; 370/248

[56] References Cited

U.S. PATENT DOCUMENTS

| | | | |
|---|---|---|---|
| 4,763,331 | 8/1988 | Matsumoto | 714/759 |
| 5,321,688 | 6/1994 | Nakano et al. | 370/244 |
| 5,337,307 | 8/1994 | Sato et al. | 370/397 |
| 5,440,565 | 8/1995 | Miyamoto et al. | 714/715 |
| 5,513,191 | 4/1996 | Takechi et al. | 714/752 |
| 5,541,926 | 7/1996 | Saito et al. | 370/474 |
| 5,570,357 | 10/1996 | Tetering et al. | 714/712 |
| 5,579,303 | 11/1996 | Kiriyama | 370/252 |
| 5,627,821 | 5/1997 | Miyagi | 370/242 |
| 5,633,868 | 5/1997 | Baldwin et al. | 370/331 |
| 5,634,097 | 5/1997 | Ashi et al. | 714/45 |
| 5,675,578 | 10/1997 | Gruber et al. | 370/248 |
| 5,790,525 | 8/1998 | Ono et al. | 370/244 |
| 5,886,989 | 3/1999 | Evans et al. | 370/347 |
| 5,914,966 | 6/1999 | Bochereau | 714/712 |
| 6,061,825 | 5/2000 | Wolf | 714/776 |

OTHER PUBLICATIONS

Park (Bi–Directional 3–Port ATM Cam Supporting Fast Look–Up and Reduced Cycle Time. IEEE, Oct. 1996).

Chan et al.(Preemptive Reservation Arbitrated Access for Transporting Variable Bit Rate Isochronous Traffic Over Dual Bus M.A.N., IEEE, Mar. 1997).

*Primary Examiner*—Albert DeCady
*Assistant Examiner*—Guy Lamarre
*Attorney, Agent, or Firm*—Francis I Gray; Thomas F. Lenihan

[57] ABSTRACT

A monitoring OAM (operation administrating monitoring) cell assisted method to detect bit errors occurring in ATM useful cells on an ATM transmission link generates first control bits by evaluating bits of ATM useful cells with a selected target address in the cell head prior to feeding the ATM useful cells into the ATM transmission link, whereupon the first control bits are Abramson-encoded to generate further, second control bits. The first control bits are additionally encoded to produce additional, third control bits, all of which are entered into the monitoring OAM cells and transmitted on the ATM transmission link with the ATM useful cells. At a receiver decoder the ATM useful cells are separated from the monitoring OAM cells, the monitoring OAM cells are error detected and corrected where necessary using the second and/or third control bits to provide error-free OAM cells, the first control bits of which are used to detect bit errors in the ATM useful cells.

6 Claims, 1 Drawing Sheet

MONITORING OAM CELL ASSISTED METHOD OF DETECTING BIT ERRORS OCCURRING IN ATM USEFUL CELLS ON AN ATM TRANSMISSION LINK

BACKGROUND OF THE INVENTION

The invention relates to a monitoring OAM cell assisted method enabling continuous intrasystem determination of bit errors which have occurred in ATM useful cells with a useful information field and a cell head on an ATM transmission link.

In a known method of this kind (Andreas Wolf, 'Leistungsmessungen in ATM-Netzen', NTZ volume 47, issue 6, 1994, pages 408 to 413) monitoring OAM cells are used for continuous intrasystem monitoring of an ATM transmission link. For this purpose, the monitoring OAM cells are introduced into the cell stream of the ATM useful cells. EDC data (EDC: error detecting code) contained in the useful data of said monitoring OAM cells allows the detection of bit errors in ATM useful cells. In practice, only ATM useful cells with a selected target address in the cell head are used. According to the above-quoted prior art, the useful data of the monitoring OAM cells furthermore include ECB data (ECB: error check bits) allowing the detection of bit errors in the monitoring OAM cell in question. To be more precise, this is the cyclic supplementation of an Abramson code which makes it possible to detect up to three bit errors. If, during a verification of the ECB data, errors are detected in one of the monitoring OAM cells, such cell is eliminated and not used for evaluation.

BRIEF SUMMARY OF THE INVENTION

It is the object of the present invention to provide a method for detecting bit errors which have occurred in ATM useful cells on an ATM transmission link, which method allows the detection of almost all bit errors in ATM useful cells with the selected target address in the cell head.

This object is accomplished according to the invention in that the monitoring OAM cells which were recognized as having been transmitted defectively are corrected by means of their further control bits and thus converted into error-free monitoring OAM cells if a single bit error or a single double bit error has occurred in the one control bits and/or in the further control bits of the monitoring OAM cell. The one control bits of these monitoring OAM cells are then used for detecting the bit errors which have occurred in the received ATM useful cells with the selected target address in the cell head.

The essential advantage of this method is that—after the correction of the monitoring OAM cells which were recognized as having been transmitted defectively—a larger total of monitoring OAM cells is available for evaluation, making it possible to more reliably determine bit errors in the ATM useful cells with the selected target address in the cell head than by means of the known method.

Abramson encoding the monitoring OAM cells only allows the correction of one bit error or one double bit error in these cells. If it is desired to be able to also correct monitoring OAM cells which contain more than one bit error or more than one double bit error, it is considered advantageous within the scope of a further development of the method according to the invention to generate additional control bits by additionally encoding the one control bits, said additional control bits then being transmitted together with the one control bits and the further control bits in the monitoring OAM cells, said additional control bits being used for detecting defectively transmitted monitoring OAM cells and/or for correcting the monitoring OAM cells recognized as having been transmitted defectively.

Since the monitoring OAM cells fed into the cell stream are of a predetermined constant cell length, it is considered advantageous to use a block code for additional encoding.

A very efficient type of encoding is BCH encoding (BCH: Bose Chaudhuri Hocquenghem) or CCF encoding (CCF: cross-correlation function) and it is thus considered advantageous to use a CCF code or a BCH code as the block code.

BRIEF DESCRIPTION OF THE SEVERAL VIEWS OF THE DRAWING

As an illustration of the invention, the (only) FIGURE is a block diagram view of an embodiment of an arrangement for performing the method according to the invention.

DETAILED DESCRIPTION OF THE INVENTION

Figure 1:
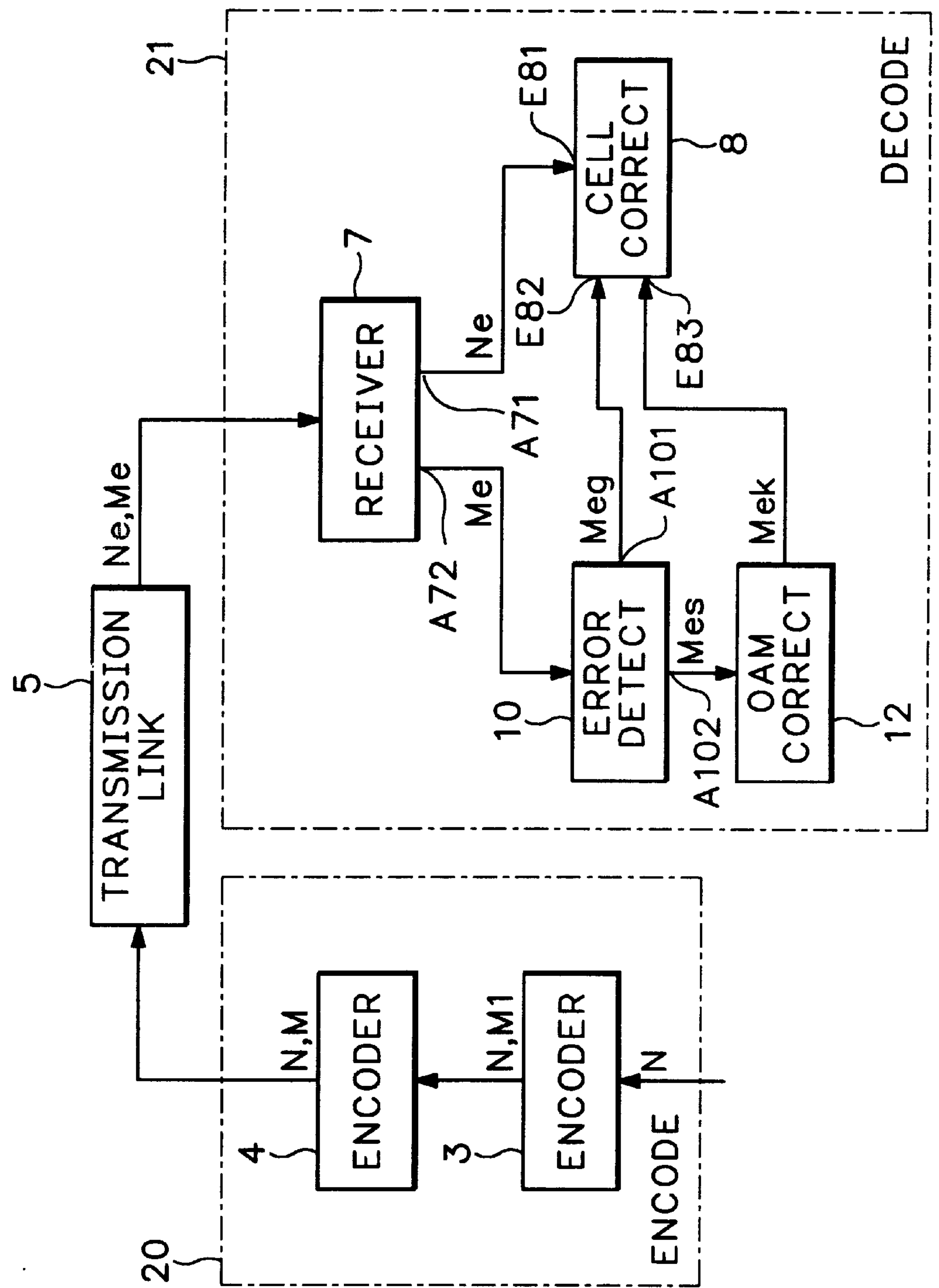

Via its output, an encoding means 3 is connected to an additional encoding means 4. The additional encoding means 4 has its output connected to an ATM transmission link 5 which is followed by a receiving unit 7. Connected after one output A71 of the receiving unit 7 is one input E81 of a useful cell correction unit 8. One further output A72 of the receiving unit 7 is connected to an error detection device 10. One output A101 of the error detection device 10 is connected to a further input E82 of the useful cell correction unit 8. Connected after a further output A102 of the error detection device 10 is an OAM correction device 12. Connected after the latter is an additional input E83 of the useful cell correction unit 8. The encoding means 3 and the additional encoding means 4 constitute an encoding circuit 20; the receiving unit 7, the error detection device 10, the useful cell correction device 8 and the OAM correction device 12 constitute a decoding circuit 21.

ATM useful cells N with a useful information field and a cell head are passed from a message source (not shown) to the encoding means 3, the input of which at the same time constitutes the input of the encoding circuit 20. Said encoding means 3 generates control bits for monitoring OAM cells through an evaluation of bits of ATM useful cells with a selected target address in the cell head, e.g. according to the above cited prior art. Besides EDC data (EDC: error detecting code) for detecting bit errors in the ATM useful cells with the selected target address in the cell head, such control bits may also include TUC data (TUC: total cell number) indicating the number of ATM useful cells fed into said ATM transmission link 5, as well as MSN data (MSN: monitoring OAM cell sequence number) indicating the continuous numbering of the monitoring OAM cells. Said control bits are entered into the monitoring OAM cells M1 generated in the encoding means 3. Subsequently, the control bits are Abramson-encoded (extended Hamming code), for instance CRC-10-encoded, thus forming further control bits (M. Y. Rhee, 'Error Correcting Coding Theory', McGraw-Hill Publishing Company, 1989 and J. Swoboda, 'Codierung zur Fehlerkorrektur und Fehlererkennung', R. Oldenbourg Verlag, München, 1973). The further control bits are entered into the respective monitoring OAM cells M1.

From said encoding means 3, the ATM useful cells N and the monitoring OAM cells M1 with the one control bits and the further control bits are transmitted to the additional encoding means 4. Said additional encoding means 4 generates additional control bits from the one control bits of each monitoring OAM cell M1, said additional control bits being additionally entered into the respective monitoring OAM cells M1. In this manner, monitoring OAM cells M with the one control bits, the further control bits and the additional control bits are generated.

Since the monitoring OAM cells are of a constant cell length, the additional encoding performed in the additional encoding means 4 should be based on a block code which has been made such that the additional control bits will fit into the part of the useful information field that is free of the one control bits and the further control bits. The block code may for instance be based on a BCH code or a CCF code which either allow for very efficient encoding, decoding and error correction (cf. Andreas Wolf, 'Meβtechnik für das BISDN', published by VDE-Verlag GmbH, 1992).

The additional encoding means 4 feeds the useful cells N and the monitoring OAM cells M with the additional control bits into the ATM transmission link 5. From the output of the ATM transmission link 5, transmitted ATM useful cells N and transmitted monitoring OAM cells Me are passed on to the receiving unit 7 and thus to the decoding circuit 21. Said receiving unit 7 separates the transmitted monitoring OAM cells Me from the transmitted ATM useful cells Ne by reading their cell heads. The transmitted ATM useful cells Ne are passed on to the useful cell correction device 8. The transmitted monitoring OAM cells Me are transmitted to the error detection device 10 which will check on the basis of the further control bits and/or the additional control bits whether the one control bits were transmitted without errors. Monitoring OAM cells Meg which were recognized as having been transmitted error-free are passed on to the useful cell correction device 8. Transmitted monitoring OAM cells Mes found to contain errors are passed on to the OAM correction device 12. This device performs an error correction of the monitoring OAM cells Mes which were recognized as having been transmitted defectively by means of the further control bits and the additional control bits. If there is only one bit error or only one double bit error, the further control bits of the Abramson encoding may be used for correction. However, if there is more than just one bit error or more than just one double bit error in the one control bits and/or the further control bits of the monitoring OAM cells Mes recognized as having been transmitted defectively, then the additional control bits are used for correction. Instead, it is also possible to perform error detection and error correction of the transmitted monitoring OAM cells Me exclusively on the basis of the additional control bits; in such case, the further control bits will be ignored. Methods for performing error detection and error correction operations are for example described in: M. Y. Rhee, 'Error Correcting Coding Theory', McGraw-Hill Publishing Company, 1989; J. Swoboda, 'Codierung zur Fehlerkorrektur und Fehlererkennung', R. Oldenbourg Verlag, München, 1973.

After the error correction, the OAM correction device 12 converts the monitoring OAM cells Mes recognized as having been transmitted defectively into error-free monitoring OAM cells Mek. The latter are passed on to the useful cell correction device 8. The monitoring OAM cells Mes recognized as having been transmitted defectively that were impossible to correct due to an exceedingly high number of bit errors will not be processed further; they are not passed on to the useful cell correction unit 8.

Consequently, the useful cell correction unit 8 holds the transmitted ATM useful cells Ne, the monitoring OAM cells Meg recognized as having been transmitted free of errors and the monitoring OAM cells Mek from which any errors have been eliminated. The one control bits of these monitoring OAM cells Meg and Mek are used for determining bit errors in the ATM useful cells with the selected target address in the cell head.

A data processing system may be used for performing the method according to the invention.

What is claimed is:

1. A method of detecting bit errors in ATM useful cells, each ATM useful cell having a useful information field and a cell head, on an ATM transmission link using monitoring OAM cells comprising the steps of:

generating first control bits by evaluating bits of the ATM useful cells with selected target addresses in the cell head prior to feeding the ATM useful cells into the ATM transmission link;

first encoding the first control bits further to generate second control bits;

second encoding the first control bits additionally to generate third control bits;

entering the first, second and third control bits into the monitoring OAM cells;

feeding the monitoring OAM cells with the first, second and third control bits into the ATM transmission link;

separating the monitoring OAM cells from the ATM useful cells at a receiver decoder;

checking the monitoring OAM cells to identify, on the basis of the second and/or third control bits, error-free monitoring OAM cells where the first control bits were transmitted without errors;

correcting errors in the monitoring OAM cells where the first control bits were transmitted with errors using the second and/or third control bits;

converting the monitoring OAM cells from the correcting step into error-free monitoring OAM cells; and determining bit errors in the ATM useful cells using the first control bits from the error-free monitoring OAM cells.

2. The method of claim 1 wherein a block code is used for the second encoding step.

3. The method of claim 2 wherein the block code is a code selected from a group consisting of CCF and BCH codes.

4. An apparatus for detecting bit errors in ATM useful cells, each ATM useful cell having a useful information field and a cell head, on an ATM transmission link using monitoring OAM cells comprising:

a first encoder for generating first control bits by evaluating bits of the ATM useful cells provided at an input with selected target addresses in the cell head prior to feeding the ATM cells into the ATM transmission link and for further coding the first control bits to produce second control bits, the first and second control bits being entered into the monitoring OAM cells provided at an output of the first encoder;

a second encoder for generating from the first control bits applied at an input additionally third control bits, the third control bits being entered into the monitoring OAM cells, the monitoring OAM cells with the first, second and third control bits being provided at an output that is coupled to an input of the ATM transmission link;

a decoder having an input coupled to an output of the ATM transmission link for receiving the ATM useful cells and monitoring OAM cells, the decoder separating the ATM useful cells from the monitoring OAM cells, detecting from the monitoring OAM cells error-free monitoring OAM cells and correcting monitoring OAM cells that are not error-free using the second and third control bits to produce error-free monitoring OAM cells, and using the first control bits from the error-free monitoring OAM cells determining bit errors in the ATM useful cells.

5. The apparatus as recited in claim 4 wherein the second encoder uses a block code for generating the third control bits.

6. The apparatus as recited in claim 5 wherein the block code is selected from a group consisting of CCF and BCH code.

* * * * *